No. 795,002. PATENTED JULY 18, 1905.
A. NELSON.
VESSEL.
APPLICATION FILED FEB. 10, 1905.
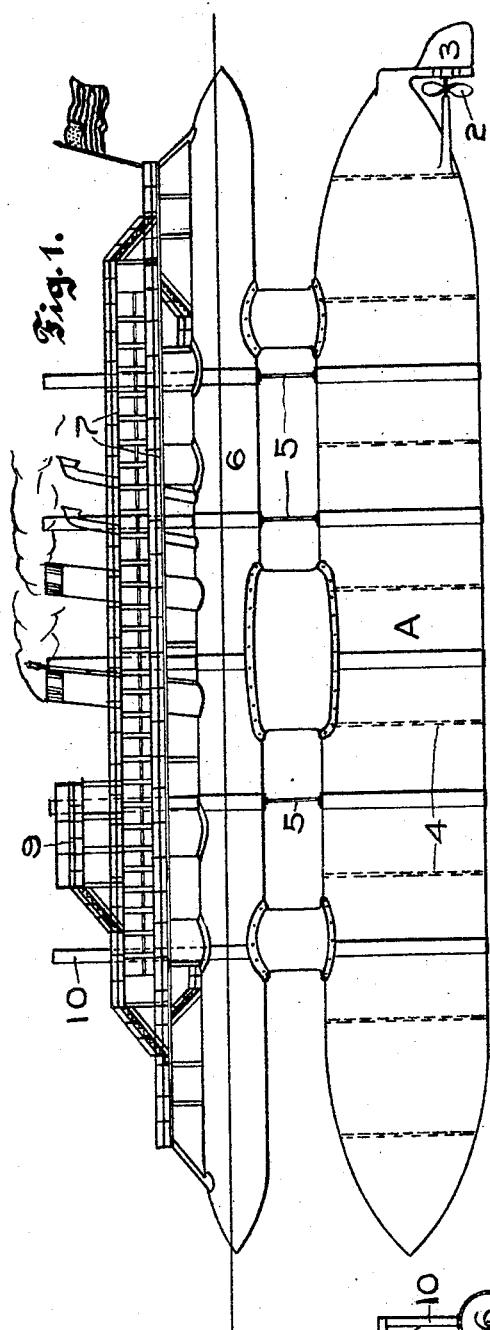
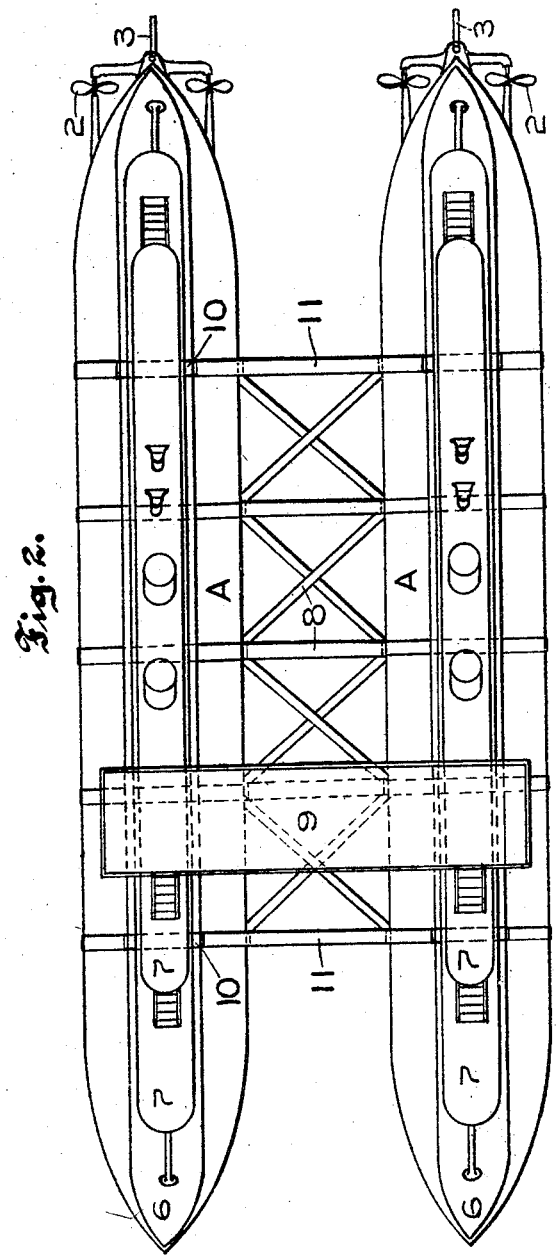
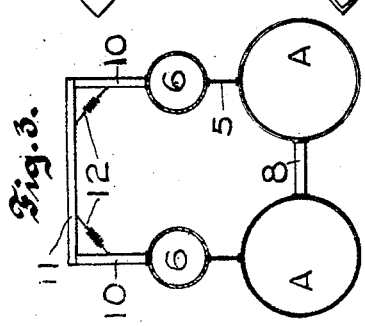
Witnesses
W. H. Palmer
Emily F. Otis
Inventor,
Albin Nelson.
by Lothrop Johnson
his Attorneys.

No. 795,002.

Patented July 18, 1905.

UNITED STATES PATENT OFFICE.

ALBIN NELSON, OF GLADSTONE, MINNESOTA.

VESSEL.

SPECIFICATION forming part of Letters Patent No. 795,002, dated July 18, 1905.

Application filed February 10, 1905. Serial No. 245,011.

*To all whom it may concern:*

Be it known that I, ALBIN NELSON, a citizen of the United States, residing at Gladstone, in the county of Ramsey and State of Minnesota, have invented certain new and useful Improvements in Vessels, of which the following is a specification.

My invention relates to improvements in sea-going vessels, its object being to provide a sea-going boat for either passenger or freight purposes which will be more efficient than the ordinary construction.

To this end my invention consists in providing a pair of submerged hulls, above which are supported floating hulls and framework.

In the accompanying drawings, forming part of this specification, Figure 1 is a side elevation of my improved vessel. Fig. 2 is a plan view of the same, and Fig. 3 is a conventionalized vertical section.

In the drawings, A represents a pair of submerged hulls of suitable shape and construction. The hulls A support the propellers 2 and rudders 3. The driving machinery and coal are preferably arranged within the hulls A, and where the vessel is used in transporting such freight as oil the hulls are preferably divided into compartments by partitions, as illustrated by dotted lines in Fig. 1.

Supported above the submerged hulls by suitable framework 5 are upper floating hulls 6. Where desired, decks 7 are supported above the hulls 6. The hulls may be connected by suitable framework 8 so constructed and arranged as to offer the least possible resistance to the water. The decks of the upper hulls are also adapted to be connected by a suitable bridge 9. Also forming connecting-framework for the upper hulls are standards 10, connected by horizontal beams 11, the connected ends of the standards and cross-beams being connected by spring-rods 12. This connecting-framework for the upper hulls will permit of framework between the lower hulls being dispensed with, in which case all of the connecting-framework will be above the water-line, so as not to impede the travel of the vessel.

While I have shown my vessel consisting of two sets of lower and upper hulls, I may construct the vessel of one upper and one lower hull.

Among the advantages of my construction are:

First. The lower hull being entirely below the water is kept at a cooler temperature in summer and warmer temperature in winter than if upon the top of the water. This is of great advantage in the carrying of certain characters of freight.

Second. The lower submerged hull is better adapted for the carrying of oil than the ordinary vessel.

Third. By reason of the large space afforded within the lower hull the upper hull may be much narrower in width, and thus break through ice much more easily than the ordinary vessel. On this account my construction of vessel may be used in the winter-time where it would not be possible to use the ordinary vessel on account of the ice.

Where the submerged hull is loaded with freight its weight will be sufficient to hold it at a certain distance below the surface of the water, and the floating hull will assist in holding it in that position. The upper hull can also be furnished with ballast where necessary to hold the submerged hull at the proper distance below the surface of the water.

Having now described my invention, what I claim as new, and desire to secure by Letters Patent, is—

1. A vessel of the class described consisting of two submerged hulls, a pair of hulls supported above the same, and connecting-framework.

2. A vessel of the class described consisting of two submerged hulls, propelling mechanism therefor, a pair of smaller hulls supported above said submerged hulls, and a bridge connecting said upper hulls.

3. A vessel of the class described consisting of a pair of submerged hulls, a pair of smaller floating hulls supported above said submerged hulls, framework connecting said hulls, and propelling mechanism for said vessel.

4. A vessel of the class described, consisting of a pair of submerged hulls, a pair of smaller floating hulls supported above said submerged hulls, framework connecting said floating hulls consisting of standards carried by said hulls, cross-beams connecting said standards, 5 a spring connection between said cross-beams and standards, and propelling mechanism for said vessel.

In testimony whereof I affix my signature in presence of two witnesses.

ALBIN NELSON.

Witnesses:
H. S. JOHNSON,
EMILY F. OTIS.